United States Patent Office 3,231,517
Patented Jan. 25, 1966

1

3,231,517
MODIFYING THE ACTIVITY OF HALOGEN-CONTAINING CATALYSTS
Herman S. Bloch, Skokie, and George R. Donaldson, Barrington, Ill., assignors to Universal Oil Products Company, Des Plaines, Ill., a corporation of Delaware
No Drawing. Filed Sept. 30, 1963, Ser. No. 312,345
9 Claims. (Cl. 252—442)

This application is a continuation-in-part of our copending application Serial No. 248,296, filed December 31, 1962.

This invention relates to a method of modifying the catalytic activity of supported metal-metal halide catalysts of the type utilized in processes involving the transfer of hydrogen ions or hydrocarbon radicals and in which hydrogen is one of the reactive components of the reaction, whereby the addition of a halogen compound to the feed stream the activity of the catalyst in promoting the conversion is altered.

More specifically, this invention relates to a method of modifying the activity of catalysts comprising a metal selected from Group VIII of the Periodic Table supported by a refractory oxyhalide composite in conversions involving the carbonium ion mechanism,[1] such as alkylation, reforming, isomerization, and other types of conversion reactions in which hydrogen or protons play an active role, the modification comprising adding to the feed stock charged into the reaction an additive halide selected from the group consisting of the chlorides and bromides of hydrogen and the bromo- and chloro-substituted organic compounds, the halogen in said additive differing from at least a portion of the halogen of said metal halide and the addition of said halogen being effected at conditions whereby the halogen present in the halide additive undergoes exchange with at least a portion of the halogen in the supported metal halide catalyst composition.

It is well known that various conversion processes involving the carbonium ion mechanism are catalyzed by certain Friedel-Crafts metal halides of the type exemplified by aluminum chloride, aluminum bromide and other metallic halides, hereinafter more fully set forth. Many of these reactions are customarily effected in the presence of hydrogen because either the course of the reaction is altered in the direction of a desired result or the activity of the catalyst is maintained at a high level by virtue of such presence of hydrogen in the conversion zone and in contact with the catalyst. In the present process, too, hydrogen is charged with the feed stock to the reaction zone for substantially the same purposes as aforesaid.

Typical of conversion reactions involving carbonium ion mechanisms are such reactions as the alkylation of isoparaffins with mono-olefins, the alkylation of aromatic hydrocarbons containing a replaceable nuclear hydrogen atom with a mono- or diolefin, the hydrorefining treatment of petroleum-derived feed stocks boiling in the naphtha or middle distillate range for the purpose of eliminating nitrogen and/or sulfur-containing contaminants from these stocks, reforming petroleum hydrocarbons for the purpose of converting the naphthenic and paraffinic hydrocarbon components thereof into their aromatic analogs, transalkylation of alkylaromatic hydrocarbons as well as a variety of other processes characterized as conversions involving the carbonium ion mechanism.

[1] A carbonium ion is an organic, positively charged (i.e., electron deficient) ion formed in the presence of certain catalysts which induce the migration of hydrogen ions in an organic reaction. The formation of the ion accounts for the results of the reaction, as further described and explained in Principles of Organic Chemistry, by T. A. Geissman, pp. 55 and 664–665, 2nd Edition, published by W. H. Freeman & Co., 1962.

2

In the use of such catalytic agents, however, and at such reaction conditions as are involved in the typical conversions involving the carbonium ion mechanism certain undesired side reactions, the products of which are not the optimum or intended end products of the process, occur at the same time or along with the desired reaction. In many instances the undesirable end product is not merely the effect of the particular halogen or the particular metal comprising the catalyst composition, but more directly the result of excessive activity of the catyalst, the catalyst causing conversions which change the structure and/or chemical composition of the end product(s). Accordingly, it may be desirable under such circumstances to alter or modify the activity of the catalyst by reducing its ability to effect the deep-seated conversions which may also be responsible for the undesired side reactions taking place in the process. Under other circumstances, usually because of the deposition of certain resin-like or insoluble conversion products into the structure of the catalyst or by a chemical modification of the catalyst composition, the activity of the catalyst may depreciate as conversion continues and in such instances it may be desirable to raise or enhance the activity of the catalyst.

It has been found that the activity of Group VIII metals supported on a Friedel-Crafts metal halide-metal oxide complex, when utilized as catalysts for carbonium ion reactions in which hydrogen is present in the reaction zone are altered by incorporating certain halide additives into the feed stream to the reaction zone. Thus, in a process utilizing the aforementioned catalysts in which at least a portion of the metal halide is a bromide, hydrogen chloride or an organic chloride which yields hydrogen chloride at the reaction conditions of the process when added to the stream of entering reactants increases the catalytic activity of the catalyst for the reaction. On the other hand, in a carbonium ion reaction catalyzed by a suported metal halide of which a significant proportion of the halide is chloride, the addition to the feed stock of a bromide selected from hydrogen bromide and an organic bromide which yields hydrogen bromide at the reaction conditions, results in the replacement of a portion of the chloride from the catalyst composition with bromine, and a resulting reduction in the activity of the catalyst for effecting deep-seated reactions involved in the conversion. For example, a conversion which may initially be too extensive, as evidenced by the appearance of such feed stock deterioration products in the effluent of the reaction as cracked or dehydrogenation products may be modified by reducing the temperature at which the conversion is effected, or preferably, by means of the present process, by adding bromides to the feed stock or by replacement by bromides of some of the chlorides already charged with the feed stock. Furthermore, a conversion midway between the activity of a sustained chloride additon and a sustained bromide addition may be realized by changing the proportion of bromides to chlorides in the blend of halide additives charged into the conversion zone with the feed stock.

One object of this invention is to modify the catalytic activity of a supported Friedel-Crafts metal halide catalyst.

Another object of this invention is to provide a means for increasing or decreasing the rate and/or depth of conversion taking place in a reaction involving the carbonium ion mechanism in which hydrogen is a reactant and simultaneously enhancing or reducing the yield of conversion products formed in the process.

In one of its embodiments this invention relates to a method for modifying the activity of a catalyst for promoting a reaction involving the carbonium ion mechanism in the presence of hydrogen, said catalyst comprising a Group VIII metal of the Periodic Table supported by a refractory composite of a Friedel-Crafts metal halide and a refractory oxide of a polyvalent metal, which comprises adding to the feed stock charged to the reaction zone containing said catalyst an additive halide selected from the group consisting of the hydrogen halides and the hydrocarbon halide derivatives of chlorine and bromine, the halogen of said additive halide differing at least in part from the halogen of said metal halide, while maintaining said catalyst at a temperature sufficient to effect halogen exchange between the halogen in said Friedel-Crafts metal halide composite and the halogen of said additive.

The present process for modifying the activity of catalysts in situ during the course of a catalyzed conversion reaction is characterized essentially as a halogen exchange reaction involving the substitution of at least a portion of the halogen present in the catalyst composite by the halogen present in the halide additive charged with the feed stock, the additive halogen being present initially in the feed stock as a hydrogen halide selected from hydrogen chloride and hydrogen bromide or as an organic halide which forms the corresponding hydrogen halide by in situ decomposition at the conditions of the catalyzed conversion reaction involving the carbonium ion mechanism. These reactions are generally effected by contacting the mixed hydrogen-hydrocarbon feed stock, with a fixed or moving bed of a catalyst comprising a Group VIII metal of the Periodic Table supported by a composite of a Friedel-Crafts metal halide and a refractory oxide of a polyvalent metal such as alumina or an aluminum oxychloride, the composite being of a type capable of undergoing halogen exchange with the halide additive charged to the reaction zone in admixture with the feed stock. The mechanism of the halogen exchange between the halide additive and the halide in the supported Friedel-Crafts catalyst composition is more than the mere adsorption of the additive halide on the surface of the catalyst or the support (generally an adsorptive type of material), since a stoichiometric exchange of the halogen in the feed stream for a portion of the halogen present in the supported Friedel-Crafts halide component of the catalyst occurs during the present process, the flow of halogen continuing until equilibrium between the halogen in the feed stream and the halogen on the catalyst is established. The exchange of halogen is accompanied by the disappearance of the halogen present in the feed stream and the simultaneous transfer of the halogen released (as hydrogen halide) from the catalyst into the reactant phase, indicating an ionic exchange reaction, rather than a surface adsorption effect between the solid and fluid phases existing in the process. The fact that the solid catalyst phase in effect becomes "saturated" with the hydrogen halide present as such or present as a dehydrohalogenation product of an organic compound in the feed stream as the solid phase gradually acquires a "spent" condition during the exchange reaction, and the fact, further that the exchanged hydrogen halide present via exchange on the solid catalyst is again released when the converted catalyst is restored to its initial composition by contact with hydrogen halide vapors of the halide initially present in the catalyst composition establishes the mechanism of the exchange as a reversible, equilibrium reaction. Accordingly, the equilibrium established between the hydrogen halide present in the feed stream and the halide present in the solid catalyst can be shifted in either direction, depending upon the particular halogen and its concentration in each phase. For example, when the halogen component of the catalyst composition is predominantly chloride the equilibrium can be shifted toward the formation of a bromo-chloride or more completely to the bromide itself by charging hydrogen bromide or an organic bromide with the feed stock into the conversion zone, at temperatures sufficient not only to dehydrohalogenate the organic bromide (when the latter constitutes the source of fluid phase bromide) but also to effect the required halogen exchange. In the case of the exchange of bromide in the fluid phase for chloride in the solid phase the exchange occurs when the bromide is present in molar excess in the feed stream relative to the released chloride present in the feed stream. The reverse shift of the equilibrium toward the displacement of hydrogen bromide from a supported bromide or bromo-chloride, accompanied by regeneration of the chloride catalyst occurs when the proportion of hydrogen chloride relative to hydrogen bromide in the feed stream contacted with the supported bromide catalyst is sufficient to effect the exchange of chloride for supported bromide. The particular instance in which the exchange occurs between hydrogen bromide and an oxychloride or subchloride catalyst composition (the reverse of the exchange occurring between hydrogen chloride and a sub-bromide composition) is illustrated by the following empirical equation:

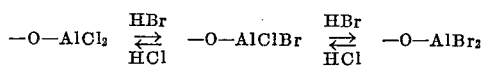

The above reversible exchange occurs isothermally as well as at dissimilar temperatures, depending upon the direction in which the equilibrium is to be shifted, the direction of the equilibrium shift under isothermal conditons being dependent upon the relative proportion of hydrogen chloride and hydrogen bromide in contact with the solid catalyst phase.

Although the unmodified Friedel-Crafts metal halides generally, such as anhydrous $AlCl_3$, $AlBr_3$, $FeCl_3$, $SnCl_4$, etc., are catalysts for reactions involving the carbonium ion mechanism, their catalytic activity is not generally altered by adding a different hydrogen halide to the reactant feed stream than the halide already present in the catalyst. Indeed, such bromides as anhydrous aluminum bromide are more active catalysts than the corresponding chlorides such as anhydrous aluminum chloride, for catalyzing a carbonium ion reaction such as isomerization; accordingly, the addition of hydrogen chloride to the feed stock in a reaction being catalyzed by a Friedel-Crafts metal bromide either depreciates or has no effect on the activity of the unmodified Friedel-Crafts bromide catalyst for the reaction, an effect opposite to that observed for the metal oxide-Friedel-Crafts metal halide composites or complexes utilized in the process of this invention, the catalytic activity of which increases as the proportion of chloride to bromide in the catalyst composite increases (i.e. accompanying the addition of hydrogen chloride to the feed stream) and decreases as the proportion of bromide to chloride in the catalyst composite increases, accompanying the addition of hydrogen bromide to the feed stream.

In the halogen exchange stage of the process, the feed stock containing the hydrogen halide formed either from an organic halide in an upstream decomposition reactor, or in situ in the presence of hydrogen and oxymetal halide catalyst, or as hydrogen halide itself mixed initially with the feed stock is contacted with the catalyst at the particular conversion temperature and pressure required to effect the desired reaction of the feed stock. For most carbonium ion reactions the temperature of conversion lies within the range of from about —30° to about 200° C. In general, the exchange reaction occurs more readily (that is, at a more rapid rate) at temperatures in the upper region of the foregoing range and accordingly, the temperature of the feed stream can be adjusted upwardly to hasten the conversion of the catalyst to a more or less active form. The required exchange temperature is also dependent upon whether the conversion of an organic halide present in the feed stock to a corresponding hydrogen halide by in situ decomposition of the organic halide is to occur during the ensuing conversion reaction, in which event the reaction temperature must necessarily lie in the range in which the organic halide undergoes dehydrohalogenation or reaction with hydrogen to form the corresponding hydrogen halide, reactions which generally require a temperature in the upper region of the foregoing temperature range. The pressure maintained in the reaction zone is largely determined by the physical state of the fluid feed stock (that is, whether in liquid or gaseous form), the maintenance of a liquid phase in the reactor, which is generally preferred for most processes, requiring higher pressures than the maintenance of vapor conditions in the halogen exchange zone. Pressures from atmospheric to 50 to 60 atmospheres, however, are generally sufficient for most feed stocks undergoing carbonium ion reactions.

The present catalysts as they exist in the present conversion reaction involving the carbonium ion mechanism (i.e. in the presence of hydrogen at the conversion conditions of the reaction) are essentially composites of a metal selected from the metals of Group VIII of the Periodic Table supported by a metal oxide-Friedel-Crafts metal halide complex in which the halogen is replaceable by the halogen of the present halide additive. The composition and physical structure of the catalyst are factors which are variable within certain limits defined by the system undergoing conversion. The metal oxide-Friedel-Crafts metal halide supports for the Group VIII metal catalyst, are solid composites in the nature of what is believed to be a complex between the refractory metal oxide and the Friedel-Crafts metal halide. More specifically, the refractory metal oxide is selected from the oxides of the polyvalent metallic elements and the Friedel-Crafts metal halides are selected from the bromides and chlorides, the metal halide component existing in the complex as an association with the metal oxide in the form of an oxyhalide complex in which the valence bonds of the Friedel-Crafts metal are shared by both oxygen and halogen. In other cases, especially when the support is impregnated with a Friedel-Crafts metal halide at an elevated temperature and thereafter swept free from excess metal halide, the composite is a reaction product of the support and the metal halide, characterized as an oxyhalide, illustrated in the case of aluminum halides in the above equation as: —O—AlCl$_2$ or —O—AlBr$_2$. Although the catalyst present in the reaction zone is prepared from a Friedel-Crafts metal halide, the essentially active complex resulting from the preparation does not contain the metal halide in its free form but is bound to the metal oxide support by shared or primary valence bonds.

In the first step of preparing a catalyst composition for use as the catalytic agent in the present conversion reaction involving the carbonium ion mechanism, a Friedel-Crafts metal halide selected from the chlorides and bromides is vaporized, sublimed or otherwise deposited on a refractory oxide until the increase in the weight of the supporting oxide is in the range of from about 2 to 50 percent of the final composite. The amount of Friedel-Crafts metal halide initially composited with the refractory oxide by deposition thereon is preferably at least double the amount eventually desired in the final composite, although in a continuous process for preparing the composite comprising the catalyst, by means of, for example, a continuous vaporization or sublimation procedure, the amount of metal halide combined with the refractory oxide in the compositing procedure may be reduced to an amount just slightly greater than the desired net increase in weight of the final composite. It is obvious that this quantity, in any event, is not a critical or limiting proportion with the metal oxide; that is, the maximum amount may be varied over a rather wide range, since any excess metal halide above that required to form the subhalide complex present in the final composite by reaction between the metal halide and the refractory oxide will be removed in the subsequent calcination step, solvent washing step or other procedure for the removal of non-complexed metal halide during the final stages of the preparation of the catalyst composite.

Various Friedel-Crafts metal halides may be used in the compositing stage of the preparation, depending upon the particular carbonium ion process in which the catalyst is to be used and not necessarily with equivalent results for all metal halides. Typical examples of suitable halides for use herein include the various valence modifications of the bromides and chlorides of such metals as aluminum, antimony, beryllium, iron, gallium, tin, titanium, cadmium, bismuth, zinc and zirconium. Because of their availability and suitability for every use in reactions involving the carbonium ion mechanism, the chlorides of the foregoing metals, such as aluminum chloride, antimony pentachloride, stannic chloride, zirconium tetrachloride, etc., are especially preferred in the present process. Of the foregoing Friedel-Crafts metal halides, aluminum chloride constitutes a particularly preferred member of the group because of the ease of preparation (excess aluminum chloride being sublimed from composites containing the same with relative ease) and the high activity of catalyst composites prepared therefrom; aluminum chloride is also preferred, when the refractory oxide component of the subhalide catalyst complex is aluminum oxide, which comprises an especially preferred refractory oxide component of the present catalyst composite.

The refractory oxides of polyvalent elements which are generally, although not necessarily, metals and which comprise one of the components involved in the preparation of the catalyst complex of this invention, include such oxides as silica (a non-metallic refractory oxide), alumina, titanium dioxide, zirconium dioxide, chromium oxide, vanadium oxide, boron oxide, zinc oxide and combinations of one or more of the foregoing refractory oxides such as chromia-alumina, silica-alumina, silica-zirconia, alumina-boria, bauxite, koalin, Kieselguhr, etc. These oxides generally maintain their crystalline or amorphorous structure at temperatures at least up to about 550° C. and accordingly are "refractory" within the requirements of metal oxides for use herein as a component of the present catalyst composites. Of these refractory oxides, alumina is particularly suitable and preferred because of its stability at high temperatures, its high adsorptive qualities, and its ability to complex with other metal halides. Synthetically prepared gamma-alumina which has a large surface area per unit of weight is especially suitable as the refractory oxide component.

The preferred refractory oxides are prepared in an especially purified form from a salt of the metal comprising the refractory oxide by conversion of the salt to an hydroxide or an oxide of the metal. Thus, an hydroxide or oxide derivative of the metal is precipitated from an aqueous solution of the metal salt by the addition to the aqueous solution of a suitable reagent which reacts with the salt in a metathesis type of reaction to form the hydroxide or oxide directly from the salt in the aqueous solution. Such reagents include the alkali metal and alkaline earth metal oxides, carbonates and bicarbonates. Typical useful reagents, for example, include lithium, sodium and potassium hydroxides, ammonium hydroxide, lithium, sodium and potassium carbonates, ammonium carbonates, tetramethylene triamine (formed, for example, by mixing ammonium hydroxide with formaldehyde, etc.). Thus, in the preparation of a refractory oxide in a highly purified form, represented, for example, by aluminum oxide, an aqueous solution of aluminum chloride when mixed with ammonium hydroxide forms a precipitate of hydrated aluminum hydroxide which upon filtering and drying dehydrates to the oxide. Calcination of the hydrated oxide at temperatures of from about 300° to 700° C. produces an especially active form of alumina designated as gamma-alumina. Theta alumina, another active form derived from an alumina hydrate, is also an excellent refractory oxide support and is formed by calcination of the precipitated hydroxide at temperatures in the upper region of the above range.

Silica gel, a form of silicic acid (when dehydrated) provides another type of refractory oxide suitable for use as the oxide component of the present catalyst composition. Silica gel is formed by hydrolyzing sodium silicate (water glass) with a mineral acid or by hydrolyzing in a mineral acid, the alcohol esters of silicic acid, such as ethyl orthosilicate.

Titanium dioxide and chromia comprising other refractory metal oxides usable in the preparation of the present catalyst composition are generally formed by hydrolyzing the corresponding chromium and tianium salts, such as the chlorides, using bases such as ammonium hydroxide or caustic soda to hydrolyze the salts and precipitate the oxides.

Aluminum oxide, zinc oxide and other metal oxides are also formed by the controlled oxidation of the metal itself, for example, by burning the metal in air or oxygen at a rate which limits the temperature to the production of the desired catalytic oxide. Other methods of preparation include reaction of the metallic element with water, which is accompanied by the liberation of hydrogen. The preferred refractory oxides are those which produce porous solids of high surface area, the resulting solid refractory oxides combining more readily with the metal halide component of the catalyst in the subsequent compositing or complex-forming procedure. In many instances high surface areas are developed during the preparation of the refractory oxide from the starting material under carefully controlled conditions of heating to the calcination temperature. Temperatures up to about 700° C. generally represent the upper limit for calcination to preserve the high surface area of the refractory oxide.

The metal halide reactant from which the present catalyst support is prepared by compositing the same with the aforementioned refractory oxide reactant is combined and reacted with the metal oxide by various means, the preferred method involving the sublimation and/or vaporization of the metal chloride (when applicable) onto the refractory oxide as the latter is agitated to maximize the proportion of the metal oxide surface exposed to the vapors of the metal halide. For those metal halides not readily vaporized or for those halides decomposed at or below the vaporization or sublimation temperature of the metal halide, the latter is preferentially deposited by mixing the refractory oxide with a suitable solution of the metal halide in an inert solvent, such as a normal paraffin or other organic compound which is not only stable in the presence of the metal halide but which also exists in the liquid phase at the compositing temperature. For this purpose the proportion of metal halide in the solution, all of which is deposited on the refractory oxide support by evaporation of the solvent from the resulting mixture formed by adding the solution of the metal halide to the refractory oxide, will contain only the amount of metal halide ultimately desired in the ultimate complex. Thus, for example, a solution of stannic chloride in pentane or benzene can be mixed with the refractory oxide in a proportion of the solution to metal oxide which upon evaporation of the solvent therefrom will provide a mixture containing the desired proportion of metal halide in the resulting mixture and following the formation of the slurry of solvent-dissolved stannic chloride and finely divided metal oxide, the slurry is evaporated to dryness to form the complex between the stannic chloride and metal oxide.

In another method of compositing the metal halide with a refractory oxide, the latter is exposed (preferably with stirring) to the vapors or to the finely divided particles of sublimed metal halide until the mixture contains the desired proportion of metal halide therein. The temperature at which the Friedel-Crafts metal halide is vaporized or sublimed into the refractory oxide will depend upon the particular metal halide. Sublimation in vacuo may be utilized, if necessary, to reduce the temperature required to effect the transfer of the metal halide to the mass of finely divided refractory oxide particles. Operatively useful sublimation temperatures are generally confined to limits set by the crystalline or amorphous structure of the refractory oxide. For example, gamma alumina, a particularly effective refractory oxide when composited with aluminum chloride, continues to exist in the gamma form at temperatures up to about 1100° C. and at more elevated temperatures, gamma alumina is converted to the less preferred, more dense, less porous alpha alumina which has substantially less surface area per unit weight than gamma alumina. Accordingly, the temperature limits utilized in the preparation of the subhalide complex of gamma alumina is set not only by the particular sublimation temperature of the metal halide required to transfer the latter component onto the refractory oxide base, but also by the temperature required to resublime excess free metal halide out of the catalyst complex following the initial compositing stage in the preparation of the complex. Since the hydrogen transfer or alkyl transfer activity of the catalyst composite and hence, its activity in catalyzing carbonium ion reactions is generally proportional to the metal halide refractory oxide ratio present in the composite complex, the activity of the final catalyst composition desired for a particular process is therefore to some extent predetermined by the sublimation temperature of the metal halide, the stability of the refractory oxide at elevated temperatures required for calcination of the complex, and the duration of the sublimation step.

In the preparation of one of the preferred composites for use in the present process, consisting of a composite of aluminum oxide and aluminum chloride, the aluminum chloride is sublimed onto a previouly prepared aluminum oxide at a temperature of from 180° C. to 275° C. As the aluminum chloride collects on the surface of the aluminum oxide particles, a reaction occurs between the components to form an aluminum subchloride (or oxychloride) constituting one of the preferred catalyst composites of this invention. In order to ensure removal of free aluminum chloride from the resultant complex composite, the product of the compositing procedure is calcined at a temperature above about 178° C. (the sublimation temperature of aluminum chloride) and somewhat below about 700° C., at which temperature the aluminum oxide is converted to the less adsorptive alpha form of alumina. A preferred calcination temperature lies within the range of about 300° to about 625° C., the calcination being continued for a time sufficient to remove unreacted or free aluminum chloride from the composite. The calcination is preferably effected in a stream of dry inert gas such as air, nitrogen, hydrogen or hydrogen chloride to provide a "sweeping" action of the aluminum chloride vapors from the composite. The effect of the calcination is the loss of free and excess aluminum chloride from its complex with the alumina base, leaving the subchloride in which the aluminum atoms share their valence bonds with oxygen and chlorine. The calcination temperature utilized in the compositing procedure will vary depending upon the boiling point or sublimation temperature of the particular Friedel-Crafts metal halide reactant involved, although in most instances temperatures of about 300° up to about 700° C. are generally sufficient.

Active catalytic agents containing the subhalide complex with the refractory oxide contain from about 2 to about 50 percent by weight of the Friedel-Crafts metal halide; that is, the final composite after deposition of the metal halide on the refractory oxide, followed by calcination to remove excess metal halide will contain from 2 to about 50 percent by weight of added metal halide forming the subhalide complex. While the exact increase in the weight of the metal oxide after sublimation and/or other procedure for compositing the metal halide therewith does not appear to be critical in the preparation of the ultimate catalyst composition (except that the upper limit of the amount of metal halide is necessarily determined by the production of a composite containing no free metal halide), active catalysts are generally formed when the minimum and maximum quantity of metal halide complexed with the refractory oxide lies within the range of 2 to 50 percent and more preferably, in the range of from about 3 to about 20 percent by weight of the resulting metal complex.

The physical form and particle size of the solid catalyst complex which forms the base structure on which the metal of Group VIII of the Periodic Table (herein also referred to simply as the "Group VIII metal") is deposited or which provides the strucaural support for said Group VIII metal, is not necessarily critical to its activity; however, it is generally preferred that the composite be fabricated into macro size particles to thereby enable the catalyst to be utilized in a fixed bed reactor system in which the present fluid charge stock is permitted to flow through the bed of catalyst without undue pressure drop. Since the size of the final composite particles is generally predetermined by the initial size of the refractory oxide particles, the latter are preferably preformed into particles within a size range of from about 50 mesh to about 2 mesh per inch which is accomplished by grinding the metal oxide to a powder followed by pilling the resulting powder to the desired particle size, by shifting the crushed particles to separate particles of the desired size or by suspending the sol form of the metal oxide (exemplified, for example, by silica sol or alumina sol) in a fluid which suspends the droplets of liquid sol for a time sufficient for the conversion of the sol to a solid, gel particle to take place, the resulting particles being generally in the form of oblate spheroids. Thereafter, the metal halide is deposited onto the dried and calcined refractory oxide particles in accordance with the compositing procedures hereinabove described, followed by calcination of the composite to form the subhalide complex catalyst particles, as aforesaid.

The Group VIII metals, by which classification it is intended to include not only the iron group metals of Group VIII of the Periodic Table (i.e., iron, cobalt, and nickel) but also the Platinum Group members of Group VIII (i.e., platinum, palladium, iridium, osmium, ruthenium, and rhodium, with preference for the metals being in the order named) are composited with the refractory oxide-Friedel-Crafts metal halide complex by a procedure which places the metal into the composite without destroying or substantially essentially reducing the porosity and particleform physical structure of the complex support. The Group VIII metal may be deposited into the complex after formation of the complex in particle form (i.e., after calcination), composited with the metal oxide prior to the addition of the metal halide thereto or mixed with the metal halide and composited, together with the metal halide, with the metal oxide. Furthermore, the Group VIII metal may be deposited on the surface of the refractory oxide-Friedel-Crafts metal halide complex where its catalytic activity is available to the reactants involved in the conversion with the least consumption or expenditure of the Group VIII metal, or it may be suffused throughout the structure of the complex support, as would be its form if the Group VIII metal or a compound thereof were mixed with the metal oxide or metal halide components of the support. The Group VIII metal may be added to the support as finely divided particles of metal, as a colloidal suspension of a compound of the metal such as the sulfide, as a solvent-dispersed solution of a salt-forming derivative thereof such as the chloride or bromide derivative dissolved in a suitable solvent which is non-reactive with the support such as water, benzene, a paraffinic hydrocarbon, such as n-hexane or cyclohexane (from which the solvent is subsequently evaporated to deposit the Group VIII metal derivative), or by precipitating the Group VIII metal with the metal oxide (for example, as the oxide or as the sulfide) in the preliminary stages of preparing the present catalyst compositions. Thus, a typical procedure, which is also one of the preferred methods for preparing the present catalysts, comprises precipitating the Group VIII metal as a sulfide in an aqueous suspension of the metal oxide, thereafter treating the resultant composite in an atmosphere of hydrogen which reduces the Group VIII metal sulfide to the metal, and thereafter reacting the reduced metal-metal oxide mixture with vapors or sublimate of the Friedel-Crafts metal halide at elevated temperatures as hereinabove described.

A catalyst consisting of platinum composited with an alumina-aluminum chloride complex may be prepared substantially in this manner. In another typical procedure for the preparation of the catalyst herein, a benzene or pentane solution of a Group VIII metal compound, such as the halide, is sprayed on an alumina-aluminum chloride mixture in the form of discrete particles which after calcination forms the oxyhalide complex between the alumina and aluminum chloride components and the particles formed thereby containing the Group VIII metal compound on or near the surface of the support are calcined at an elevated temperature in the presence of hydrogen to form the Group VIII metal-supported catalyst.

The quantity of Group VIII metal to be incorporated into the ultimate catalyst composition depends upon many factors, including the conversion reaction in which it is to be utilized as catalyst, the particular Group VIII metal selected, the composition of the support and also upon the position of the deposited metal on the support; i.e., whether the Group VIII metal resides on or near the surface of the particulate support or is dispersed throughout the structure of the particle. Generally, however, the ultimate catalyst composition will contain an amount of the Group VIII metal (as metal) of from about 0.01 to about 10 percent by weight of the catalyst composition. Thus, platinum, palladium and iridium-containing catalysts are highly effective with as little as 0.01 to about 1 percent by weight of the metal, whereas iron-containing and nickel-containing compositions are usually more effective with as much as 5 to 10 percent by weight of the metal present in the catalyst composition.

The processes of the present invention in which the aforementioned catalyst compositions are utilized as catalytic agents include a broad spectrum of catalyst-induced hydrogen or alkyl transfer reactions as well as a variety of other reactions, herein broadly referred to as conversions involving the carbonium ion mechanism, including such typical processes as the alkylation of aromatic or isoparaffinic hydrocarbons with olefinic compounds, dehalogenation of halohydrocarbons such as the conversion of amyl chloride to pentane in the presence of hydrogen, or the conversion of carbon tetrachloride to chloroform, reforming of paraffinic or naphthenic hydrocarbons to effect simultaneous hydrocracking, dehydrogenation and cyclization thereof into aromatic hydrocarbons and in isomerization reactions generally for the conversion of hydrocarbons, such as normal paraffins, alkyl aromatic hydrocarbons, etc., to their isomers. In each of the foregoing reactions and in many other types of conversion processes, the mechanism of the conversion is believed to depend upon the formation of a carbonium ion involving the formation of an electron-deficient organic radical arising out of the displacement of a hydrogen atom or alkyl group from the structure of one of the reactant molecules (a transistory intermediate) which combines in the presence of the catalyst with one or more electronegative radicals to form the ultimate conversion product.

In each instance when starting with a catalyst in which the bromide ion forms a part of the complex in the catalyst composition, the presence of an alkyl or other organic chloride or the presence of hydrogen chloride in the feed stream to the conversion zone results in a stoichiometric displacement of bromine from the catalyst composition accompanied by the substitution into the composition of an equivalent proportion of chlorine, as evidenced by the appearance of a stoichiometric proportion of bromide in the conversion effluent (usually as hydrogen bromide) and a proportionate increase in the chlorine analysis of the catalyst composition. On the other hand, when the catalyst composite contains a significant proportion of chloride bound to the refractory oxide base and to the metal of the metal halide component, and an organic bromide or hydrogen bromide is added to the feed stream to the conversion zone, a displacement of chlorine from the catalyst complex occurs when the stoichiometric proportion of bromide in the feed stream is sufficient to drive the displacement of chloride with bromide forward toward the formation of bromides on the catalyst from the chlorides present, as determined by the mass action effect. The displacement of chloride is generally complete with as much as from 0.05 to 10 percent bromine (as hydrogen bromide or organic bromide) in the feed stream to the conversion zone containing the catalyst. Such displacement reactions take place concurrently within the catalyst composition at the particular conversion conditions provided for the carbonium ion reaction catalyzed by the oxyhalide complex. Thus, at temperatures generally suitable for isomerization of aliphatic hydrocarbons, in the range of from about 25° to about 200° C., the replacement of halogen in the catalyst for halogen in the feed stream proceeds at a rate proportional to the temperature of the catalyst complex, in addition to the effect of the aforementioned molar proportion of replacement halide in the feed stream to halide in the catalyst composite.

Controlling the composition of the composite catalyst involved in the conversion reaction by the present method of introducing an organic halide or hydrogen halide into the feed stock contacted with the catalyst thereby controls the activity of the catalyst by virtue of the relative proportion of the chloride and bromide in the catalyst composition. As hereinabove indicated, increasing the chlorine content of the catalyst complex increases the acidity of the base which simultaneously increases the activity of the catalyst in promoting carbonium ion reactions to the same proportion as the increase in its chlorine content (up to a maximum limit), whereas a replacement of part of the chloride with bromide decreases the acidity of the base and results in a proportionate reduction in the activity of the catalyst. However, accompanying the increase in the activity of a catalyst the proportion of the feed stock charged which is consumed in side reaction byproducts also increases. For example, during the high temperature isomerization of normal alkanes into their branched chain isomers utilizing a catalyst of the present type and composition, or in the reforming of hydrocarbons to produce aromatic hydrocarbons, or in isomerization of alkyl aromatic hydrocarbons to form nuclear position isomers utilizing the catalysts of the present composition, part of the charge stock is consumed in the production of simpler or shorter chain length hydrocarbons such as methane, ethane, propane, isobutane, etc., consuming feed stock by reducing the proportion of the desired product formed during the conversion and complicating the recovery and purification stages of the process. Accordingly, in many instances it is preferable to operate at a lower conversion rate and eliminate in large part the production of side reaction products in order to conserve feed stock toward the production of desired end products, recovering unconverted feed stock from the reaction mixture and recycling the non-converted portion to enhance the overall yield. By introducing a bromide into the feed stream to the process, such as hydrogen bromide or an alkyl bromide (e.g., heptyl bromide, octyl bromide, dibromooctane and homologs of both higher and lower molecular weight), while maintaining the conversion temperature constant, the rate of conversion and also the rate of byproduct production is reduced without sacrificing the type of product obtainable at the particular conversion conditions. In other conversions, temperature changes designed to increase the reaction rate may have an undesirable effect on the composition of the reaction products, while changes in the acidity of the catalyst do affect the isomer proportion in the product or the molecular structure of the product obtained; hence, only by means of the present introduction of a bromide or a chloride into the feed stream, as required, can the activity of the catalyst and the product composition be altered significantly without changing the conversion temperature.

The process of the present invention is further illustrated with respect to several of its specific embodiments in the following examples which present several runs utilizing different process variables and catalyst modifications hereinabove specified for the present invention.

EXAMPLE I

In the following run a feed stock consisting essentially of normal butane is isomerized substantially to an equilibrium mixture of normal and isobutanes by passing the feed stock, together with hydrogen at isomerizing conditions over and through a solid catalyst comprising platinum supported on an aluminum oxychloride-alumina composite base, the resulting complex being calcined and activated by heating a mixture of aluminum chloride and platinized alumina by the method described in the following preparation of an aluminum oxychloride catalyst composition containing 0.375 percent by weight of platinum. Thus, a composite of alumina and platinum was composited with sublimed aluminum chloride to form a composite of platinum and a supported aluminum oxychloride complex which is active as an isomerization catalyst for the conversion of normal butane to isobutane, the composite being prepared as follows: alumina (as aluminum hydroxide) was precipitated from an aqueous solution of aluminum chloride using hexamethylenetetraamine as the alkaline reagent to hydrolyze the chloride salt and precipitate a hydrated form of alumina, the base being added to the aqueous aluminum chloride solution with stirring until the aqueous mixture was substantially neutral. The precipitated hydrated oxide was filtered, washed with distilled water, dried at 120° C. for 10 hours, pilled, and thereafter impregnated with a dilute ammoniacal solution of chloroplatinic acid containing sufficient platinum to form a composite which when dried and calcined contained 0.375 percent by weight of platinum, based on dry alumina. The alumina-platinum chloride composite was thereafter reduced in hydrogen at 500° C. and thereafter placed in an autoclave containing 0.3 mol of aluminum chloride per mol of alumina. After sealing the autoclave and flushing the interior with nitrogen the contents were heated to 500° C. as the autoclave was rotated over a period of 3 hours. The autoclave contents were then removed and heated for 6 hours at 400° C. from a vented reaction flask. During the first one-half hour 95% of the free aluminum chloride ultimately recovered sublimed out of the flask into an air-cooled condenser. After heating an additional 5½ hours, during which the remaining free aluminum chloride was sublimed from the composite, the final catalytic composite contained 4.03% by weight of combined chloride which was not further removed at the calcination temperature of 600° C. for 3 hours. The resulting pills were cylindrical in shape and $\frac{1}{16}$-inch in diameter and length. The catalyst in this form was packed into an elongated cylinder used as an isomerization reaction vessel in the following run.

The feed stock to the isomerization reactor consisted essentially of normal butane containing about 0.1% by weight of $C_4$ olefins and not more than 0.5% by weight of isobutane. The feed stock was charged into the inlet end of the reactor at 200° C. and at 500 p.s.i.g. at a liquid hourly space velocity (volumes of liquid per volume of catalyst per hour) of 12.5. Hydrogen was added to the charge stock in vapor phase at a rate sufficient to provide a volume ratio of hydrogen to hydrocarbon feed stock of 1:1. The effluent product stream of the reactor was cooled to condense the $C_4$ hydrocarbons from the product stream, which was continuously analyzed in an infrared spectroscopic analyzer, the hydrogen being separated from the product stream and continuously recycled to the inlet end of the reactor with additional feed stock.

catalyst composition, the displacement resulting in the appearance of a corresponding equivalent amount of chloride in the product stream and a decrease in the ratio: isobutane/total butane in the product stream. These relationships and effects are noted in the following Table I which presents a running report on the course of the isomerization reaction via analysis of the product streams recovered from the isomerization reactor.

*Table I*

ISOMERIZATION OF N-BUTANE a500 P.S.I. AND 200° C. IN THE PRESENCE OF A PLATINIZED ALUMINA-ALUMINUM CHLORIDE COMPOSITE CATALYST EFFECT OF HALIDE ADDITIVES ON CATALYST ACTIVITY

| Cumulative Time on Stream, Hr. | Additive Charge | Additive Quantity, p.p.m. of Feed | Isobutane/Total $C_4$ in Product | Halogen in Product Stream | Catalyst Analysis, Wt. Percent |
|---|---|---|---|---|---|
| 0 to 10 | None | | 0.45 | None | 4.03 Cl. |
| 10 to 20 | do | | 0.45 | None | 4.03 Cl. |
| 20 to 142 | Isopropyl bromide | 100 | 0.38 | HC | |
| 142 to 285 | do | 31 | 0.32 | HCl | |
| 285 to 295 | do | 120 | 0.30 | HCl | |
| 295 to 304 | do | 31 | 0.26 | HCl | |
| 304 to 335 | do | 120 | 0.18 | HCl | |
| 335 to 358 | do | 120 | 0.12 | HCl | 5.44 Br–1.34 Cl. |
| 358 to 368 | Ethyl chloride | 100 | 0.12 to 0.22 | HBr | 4.31 Br–1.89 Cl. |
| 368 to 398 | do | 100 | 0.22 to 0.36 | HBr | |
| 398 to 450 | do | 100 | 0.36 to 0.45 | HBr | 4.01 Cl. |

The effect of chloride and bromide addition to the feed stream on the isomerizing activity of the catalyst and the yield of isobutane resulting from the conversion is determined by the addition of one or both of the alkyl halides: ethylchloride and isopropylbromide to the feed stock and noting the proportion of isobutane to combined normal and isobutane in the product stream as conversion took place and as the conversion was evaluated in the product analyzer. In each instance following a change in the composition of the feed stream to the isomerization zone (i.e., as the halide additive was changed from ethylchloride to isopropyl bromide and vice versa), the isomerization reaction was permitted to "line out" as the quantity and type of halide added to the conversion reaction zone was noted and the product was analyzed to determine the halide making its appearance (if any) in the reaction product, and particularly the proportion of isobutane in the $C_4$ portion of the product.

Both ethylchloride and isopropylbromide readily decompose by in situ dehydrohalogenation during passage of the halide additives and feed stock through the isomerization conversion zone in contact with the aluminum oxyhalide catalyst. Thus, the addition of ethylchloride to the feed stock resulted in the immediate appearance of hydrogen chloride in the conversion reaction stream and caused an increase in the isomerizing activity of the catalyst. The addition of isopropylbromide to the feed stream resulted in the displacement of chloride from the catalyst and an increase in the bromide content of the In the following run the catalyst utilized in preceding run reported in Table I was replaced by fresh catalyst containing 4.03% chloride and no bromide. For the first ten hours on stream, with the normal butane feed stock entering the isomerization reactor at 200° C. and at 500 p.s.i., normal butane was converted at a rate sufficient to yield 45 parts of isobutane per 100 parts of total $C_4$ hydrocarbons in the charge stock. Thereafter, 100 p.p.m. of the combined $C_4$ hydrocarbons comprising the feed stock of isopropyl bromide was added to the normal butane charge stream over a period of about 40 hours on stream, followed by discontinuance of isopropylbromide and the addition of ethyl chloride for the period from 50 hours on stream to 160 hours on stream. The results of this operation is reported in the following Table II.

*Table II*

| Cumulative Time on Stream, Hr. | Additive Charge | Additive Quantity, p.p.m. of Feed | Isobutane/Total $C_4$ in Product | Halogen in Product Stream | Catalyst Analysis, Wt. Percent |
|---|---|---|---|---|---|
| 0 to 10 | None | | 0.45 | | 4.03 Chloride. |
| 10 to 20 | Isopropyl bromide | 100 | 0.38 | HCl | |
| 20 to 30 | do | 100 | 0.24 | HCl | |
| 30 to 40 | do | 100 | 0.16 | HCl | |
| 40 to 50 | do | 100 | 0.12 | HCl | 5.13 Br–1.49 Cl. |
| 50 to 60 | Ethyl chloride | 50 | 0.13 | HBr | |
| 60 to 70 | do | 50 | 0.23 | HBr | |
| 70 to 80 | do | 50 | 0.32 | HBr | |
| 80 to 90 | do | 50 | 0.39 | HBr | |
| 90 to 100 | do | 50 | 0.45 | HBr | |
| 100 to 110 | do | 50 | 0.48 | HBr | |
| 110 to 140 | do | 50 | 0.48 | HBr | |
| 140 to 160 | do | 50 | 0.48 | HBr | 3.94 Cl; 0.13 Br. |

In the following run the catalyst utilized in the preceding run was replaced with fresh catalyst containing 4.03% chloride and for the first 55 hours on stream in which the normal butane charge stock entered the catalytic reactor at 200° C. and at 500 p.s.i., 50 p.p.m. of the normal butane feed stock of ethyl chloride is added to the influent charge stock. From 55 to 170 hours on stream a mixture of 44 p.p.m. of ethyl chloride and 105 p.p.m. of isopropyl bromide was added to the feed stock. In the period between 170 hours on stream and 240 hours on stream, the isopropyl bromide is withdrawn as an additive and replaced first by 98 p.p.m. and then 145 p.p.m. of ethyl chloride. In the period of operation from 240 to 320 hours on stream a mixture of 80 p.p.m. of ethyl chloride and 45 p.p.m. of isopropyl bromide was added to the feed stock and the results of this operation are reported in the following Table III.

Table III

| Cumulative Time on Stream, Hr. | Additive Charge | Additive Quantity, p.p.m. of Feed | Isobutane/Total C$_4$ in Product | Halogen in Product Stream | Catalyst Analysis, Wt. Percent |
|---|---|---|---|---|---|
| 0 to 55 | Ethyl chloride | 50 | 0.49 | HCl | |
| 55 to 60 | C$_2$Cl:44; C$_3$Br: 105[1] | | 0.44 | HCl–HBr | |
| 60 to 70 | C$_2$Cl:44; C$_3$Br: 105 | | 0.37 | HCl–HBr | |
| 70 to 80 | C$_2$Cl:44; C$_3$Br: 105 | | 0.34 | HCl–HBr | |
| 80 to 170 | C$_2$Cl:44; C$_3$Br: 105 | | 0.34 to 0.33 | HCl–HBr | |
| 170 to 180 | C$_2$Cl | 98 | 0.42 | HBr | |
| 180 to 200 | C$_2$Cl | 98 | 0.47 | HBr–HCl | |
| 200 to 240 | C$_2$Cl | 145 | 0.47 | HBr–HCl | |
| 240 to 320 | C$_2$Cl:80; C$_3$Br: 45[2] | | 0.43 | HBr–HCl | 3.60 Cl; 0.90 Br. |

[1] Equimolar ratio of Bromine to Chlorine.
[2] 80 moles of chlorine to 20 miles of Bromine.

In all of the foregoing runs the effluent products of the isomerization reaction zone were analyzed to determine their halogen content; it will be noted that when utilizing a catalyst containing only chloride as the halogen component, the isomerizing activity of the catalyst is maintained at its highest level of about 45 to 48 weight percent isobutane of the total butane components and if ethyl chloride is added to the feed stream, the activity of the catalyst remains constant, with the added chloride appearing in the product stream as hydrogen chlorine. If isopropyl bromide is then added, part of the chloride comprising the catalyst composition is replaced from the catalyst by bromine and the activity of the catalyst for isomerization of normal butane drops to its minimum conversion rate of about 12 percent by weight of isobutane in the combined C$_4$ butanes. Part of the halogen present in the catalyst composition is then bromide and part chloride; but as isopropyl chloride was then added to the feed stream, hydrogen bromide appeared in the effluent product stream, a portion of bromide originally present in the catalyst was replaced by chloride and the isomerizing activity of the catalyst thereafter increased to the level at which maximum isobutane yield is realized (i.e. at 48 parts of isobutane per hundred parts of combined butanes). The use of a mixture of ethyl chloride and isopropyl bromide as additive to the feed stock produces a catalyst of intermediate activity in which the chloride and bromide composition of the catalyst remain in steady-state equilibrium, depending upon the bromide/chloride ratio in the additive mixture.

We claim as our invention:

1. A method of modifying the activity of a catalyst for promoting a reaction which is catalyzed by Friedel-Crafts metal halides in the presence of hydrogen, said catalyst comprising a metal of Group VIII of the Periodic Table supported by a composite of a Friedel-Crafts metal halide in which the halogen is selected from the group consisting of chlorine and bromine and a refractory oxide of a polyvalent metal, which comprises adding to the feed stock charged to the reaction zone containing said catalyst an additive halide selected from the group consisting of hydrogen chloride, hydrogen bromide, a chloro-substituted hydrocarbon and a bromo-substituted hydrocarbon, the halogen of said additive differing at least in part from the halogen of said metal halide composite, and effecting halogen exchange between at least a portion of the halogen in said Friedel-Crafts metal halide composite and the different halogen of said additive.

2. The process of claim 1 further characterized in that at least a portion of the halide of the refractory composite of said catalyst is bromide and the activity of said catalyst for said reaction is increased by adding to the feed stock a chloride additive selected from the group consisting of hydrogen chloride and a chlorine-substituted hydrocarbon.

3. The process of claim 1 further characterized in that a major proportion of the halide present in the catalyst is chloride and the activity of said catalyst in promoting side reactions other than the desired reaction is reduced by adding to the feed stock charged to the reaction a bromide additive selected from the group consisting of hydrogen bromide and a bromide-substituted hydrocarbon.

4. The process of claim 1 further characterized in that said refractory composite comprises aluminum oxychloride.

5. The process of claim 1 further characterized in that said Group VIII metal is an element in the platinum group metals of the Group VIII elements.

6. The process of claim 5 further characterized in that said metal is platinum.

7. The process of claim 1 further characterized in that said halide additive is a halogen-substituted hydrocarbon which is mixed with the feed stock and maintained at a temperature sufficient to convert the hydrocarbon halide to the corresponding hydrogen halide prior to contacting said feed stock with the catalyst.

8. The process of claim 1 further characterized in that said reaction is the isomerization of a paraffinic hydrocarbon to a more highly branched chain paraffin.

9. The process of claim 8 further characterized in that said catalyst comprises platinum composited with a complex of alumina and aluminum halide, said additive halide being a chloride when the activity of the isomerization catalyst is to be increased and a bromide when the activity of the catalyst is to be decreased.

References Cited by the Examiner
UNITED STATES PATENTS

| 2,900,425 | 8/1959 | Bloch et al. | 260—683.75 X |
| 2,944,097 | 7/1960 | Starnes et al. | 260—683.68 X |
| 2,944,098 | 7/1960 | Fogle et al. | 260—683.68 |
| 2,963,528 | 12/1960 | Schwartz | 260—683.75 |
| 2,972,650 | 2/1961 | Burk et al. | 260—683.75 X |

DELBERT E. GANTZ, *Primary Examiner.*

ALPHONSO D. SULLIVAN, *Examiner.*